June 6, 1972    M. H. ARTAUD    3,667,839
MICROFICHE VIEWER
Filed May 4, 1970    3 Sheets-Sheet 2
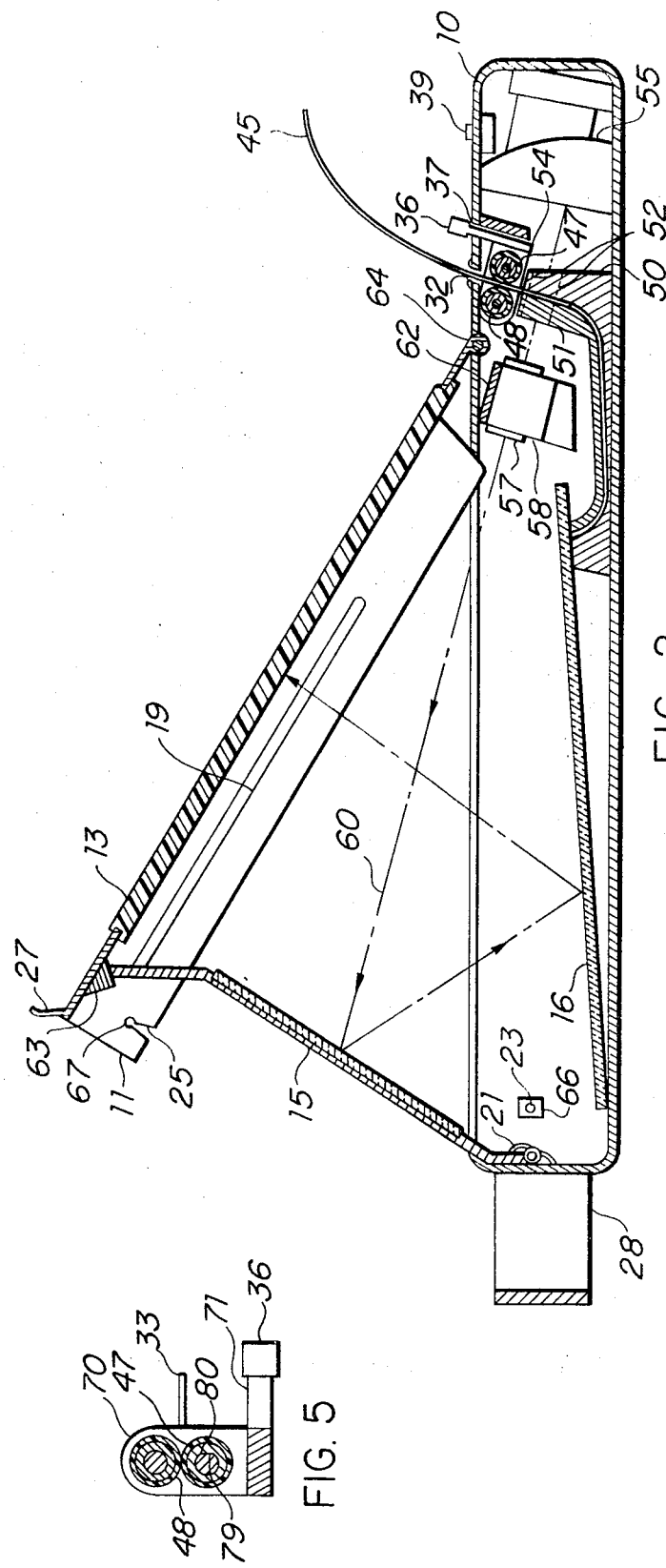
FIG. 2
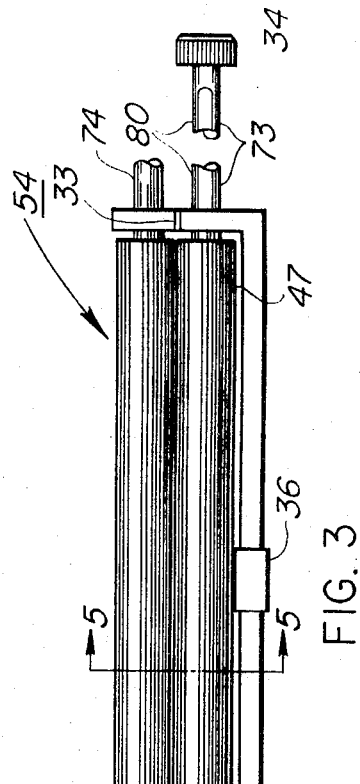
FIG. 3
FIG. 4
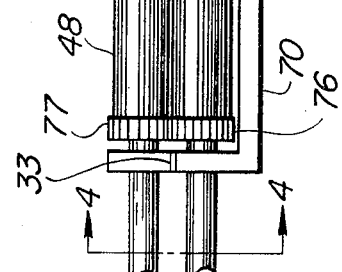
FIG. 5
INVENTOR.
MAURICE H. ARTAUD
BY John R. Duncan
ATTORNEY

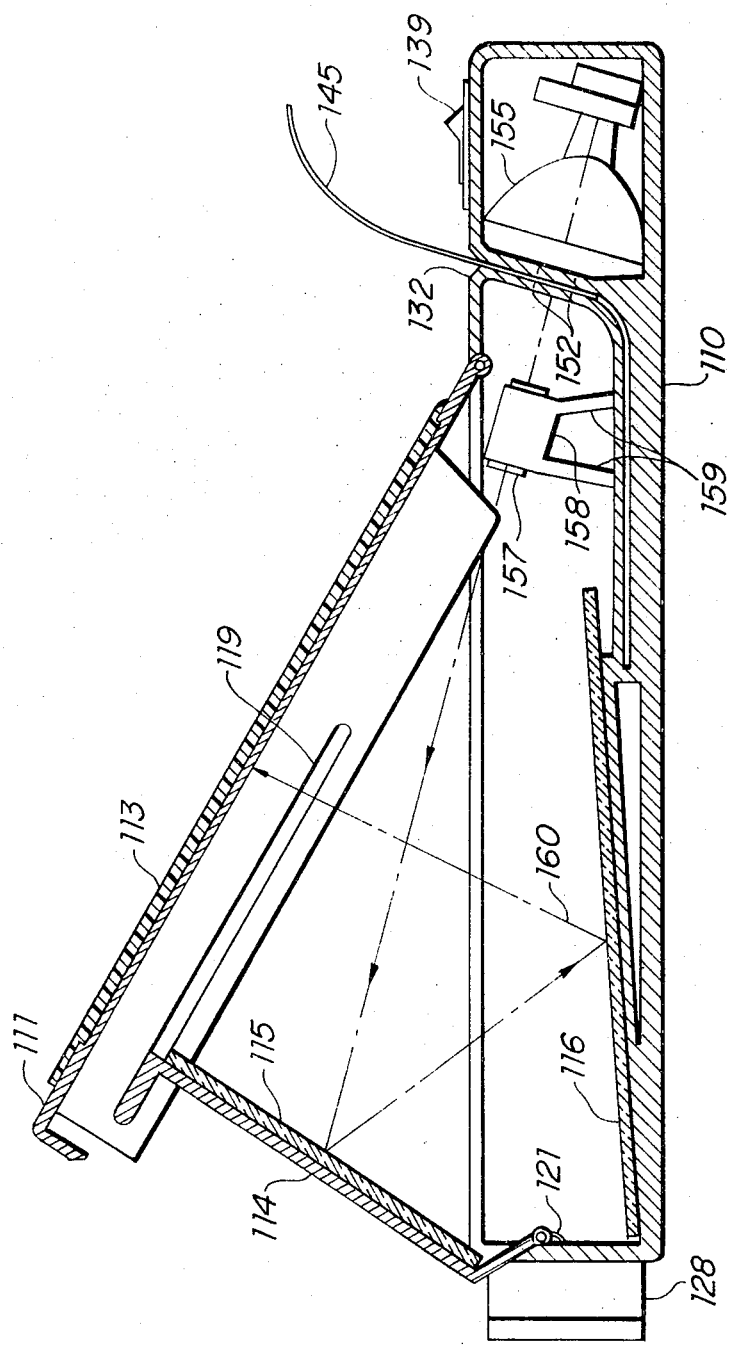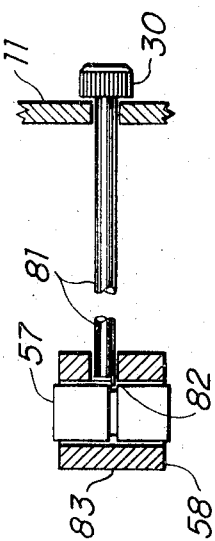

3,667,839
MICROFICHE VIEWER

Maurice H. Artaud, Spring Valley, Calif., assignor to Stromberg Datagraphix, Inc., San Diego, Calif.
Filed May 4, 1970, Ser. No. 34,199
Int. Cl. G03b 23/08
U.S. Cl. 353—27        9 Claims

ABSTRACT OF THE DISCLOSURE

A compact portable projection viewer for microimages is disclosed. The viewer includes a projection lamp, means for positioning a selected microfiche image in a projection station, and an optical system movable between a compact storage position and a viewing position in which the image is projected on a viewing screen. A simple, effective focusing system is included. In one embodiment, a parallel rotatable roller system is provided for moving a microfiche sheet, through the projection station in a first direction. Means are provided for moving the roller assembly, with the microfiche, in a direction perpendicular to the first direction. Thus, any selected microimages on the sheet may be located at the projection station.

BACKGROUND OF THE INVENTION

Microimages of text, pictorial or other matter have come into widespread use as a replacement for full-size copies on paper. The size reduction permits easy, convenient shipping and storage of large quantities of data. Typically, computer output may be recorded directly onto microfilm. This permits both very rapid printing of the computer generated information and obviates the necessity of storing large numbers of printed paper sheets. The microimages may be either viewed directly, or may be used to produce full size hard copies of selected information.

While microimages are sometimes formed on an opaque backing, it is more common to produce transparencies for viewing or copying by projection. Either opaque images on a transparent background, or transparent images on an opaque background may be provided. Generally, the microimages are produced in one or more columns on a film strip. While rolls of such film are often used, for many applications it is desirable that the film strips be cut down to individual sheets, called "microfiche," or into smaller sheets which are mounted in apertures in cards. Throughout this application, "microfiche" will be used as including any microimaged sheet having more than one row of images, whether mounted in a transparent sleeve, an apertured card or frame, or unmounted.

Rolls of microfilm may be viewed in a projection viewer having means for moving the film past a projection station or film gate. Where the microimages are in the form of microfiche, problems arise since it is necessary to select a desired image or frame for viewing from plural rows and columns of images. Often, complex platens or film gates movable in two dimensions are provided to permit this image selection in projection viewers. These systems are expensive and add undesirable weight and size to the film viewer. Also, it is often difficult to maintain the image columns vertical and prevent angular misalignment.

Where a large file system is maintained on microfiche it is desirable that each potential user of the system have immediate access to a viewer. Unfortunately, most commercial viewers are complex, large in size and expensive. Such viewers are not easily portable, so that the viewers cannot easily be taken to meetings, by salesmen on calls, etc.

Thus, there is a continuing need for more convenient and inexpensive microfiche viewers having more efficient microfiche handling and positioning mechanisms.

SUMMARY OF THE INVENTION

It is, therefore, an object of this invention to provide a microfiche viewer overcoming the above-noted problems.

Another object of this invention is to provide a simple, compact, easily portable microfiche viewer.

Still another object of this invention is to provide an improved mechanism for positioning selected microfiche images for viewing.

A further object of this invention is to provide a microfiche positioning mechanism which maintains improved angular image alignment.

The above objects, and others, are accomplished in accordance with this invention by an improved compact microfiche viewer. The viewer includes a projection lamp, a projection station or film gate, a screen and an optical system to direct the projected image from the projection station to the screen. The optical system is collapsible, forming a compact carrying case. Means are provided to permit selection of any frame on the microfiche and locating it at the projection station. A handle is provided which is movable between a carrying position and a viewing position in which it partially supports the viewer in a convenient position for viewing.

In one preferred embodiment, the viewer includes a microfiche handling and positioning mechanism which comprises a pair of substantially parallel rollers which are in line contact, or nearly in contact. A guide means is arranged to guide a microfiche into the nip between the rollers. The leading edge of the microfiche will automatically contact the line of this nip, to accurately angularly align the microfiche for insertion into the viewer. As the rollers are rotated by an external knob or handle, the microfiche smoothly feeds into the viewer past the projection station. The roller assembly is also movable in an axial direction, perpendicular to the direction of the roller feed. Thus, by combined rotation of the rollers and axial movement of the roller assembly or carriage any area or frame on the microfiche may be quickly and accurately located in the projection station which is adjacent the roller assembly.

Preferably, a guide slot is provided to guide portions of the microfiche extending past the projection station into a location within the viewer housing which does not interfere with other viewer components and permits the housing to be unusually compact.

The optical system, including the screen, of the viewer is preferably arranged so that the screen can be raised into a comfortable position for viewing, and collapsed into a compact viewer housing for storage and carrying. Similarly, for improved portability, it is preferred that the viewer housing provide storage space for batteries to power the light source. If desired, a removable cover may be used to protect the screen during storage or carrying of the viewer.

Thus, it can be seen that an unusually simple and compact viewer is provided. Details of the invention will be further understood upon reference to the drawings and the description which follows:

BRIEF DESCRIPTION OF THE DRAWING

Various features and preferred embodiments of the microfiche viewer of the invention are shown in the drawing; wherein:

FIG. 2 shows a vertical section through the microfiche viewer, taken on line 2—2 in FIG. 1;

FIG. 3 shows a detail plan view of the feed rollers and carriage;

FIG. 4 shows a vertical section through the roller assembly taken on line 4—4 in FIG. 3;

FIG. 5 shows a vertical section through the feed rollers and carriage, taken on line 5—5 in FIG. 3;

FIG. 6 shows a detail plan view of the focusing mechanism; and

FIG. 7 shows a vertical section through microfiche viewer using an alternative film feeding arrangement.

DETAILED DESCRIPTION OF THE INVENTION

Figure 1:
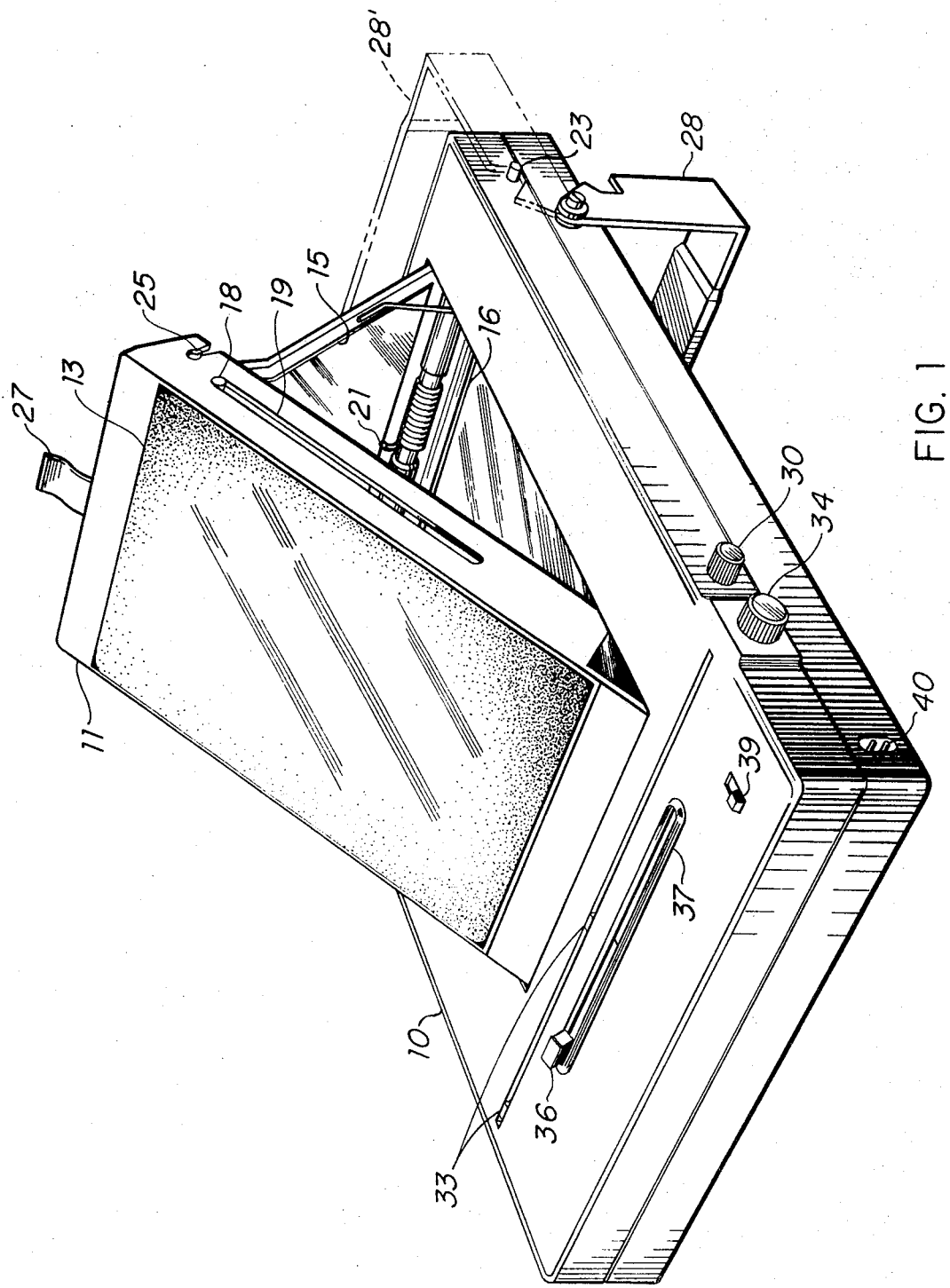
FIG. 1 shows an isometric view of the microfiche viewer.

Referring now to FIG. 1, there is seen a simple, compact, collapsible microfiche viewer. The viewer includes a housing 10 having a large opening in the upper surface in which a screen carrier 11 is located for movement between an open or viewing position as seen in FIG. 1 and a closed position in which carrier 11 is lowered and closes the opening in housing 10.

A translucent screen 13 is mounted on carrier 11. An optical system including a projection lamp and lens (as seen in FIG. 2) project the microimage against upstanding mirror 15, from which it is reflected to lower mirror 16, which in turn reflects it to screen 13 for viewing. These mirrors 15 and 16 are preferably first-surface mirrors. As seen in FIG. 1, carrier 11 occupies only a portion of the upper surface of housing 10, to provide space within housing 10 alongside carrier 11 for batteries to power the projection lamp. If desired, carrier 11 may be considerably wider, permitting a wider, larger, screen 13, if the batteries are eliminated and the lamp is powered by standard house current from a wall outlet.

Carrier 11 may be moved to the closed position by moving the upper end of upstanding mirror 15 forwardly. Pins 18 mounted on mirror 15 ride in slots 19 in carrier 11 during the closing movement. Mirror 15 is hinged at its lower end and biased into the open upright position by springs 21.

A latch pin 23 projecting from the side of housing 10 has an enlarged inner end (not shown) which engages slot 25 in carrier 11 to hold the carrier in the closed position. Pressure on pin 23 releases the latch in a conventional manner, allowing carrier 11 to be moved to the open position. Any other suitable latching mechanism may be used, if desired. A small flexible tab 27 may be secured to carrier 11 to aid in lifting it from the closed to the open position.

A combination viewing support and carrying handle 28 is pivotably secured to housing 10. During viewing, handle 28 is positioned as shown in FIG. 1 to raise the far end of housing 10 to bring screen 13 into a comfortable viewing angle. When the viewer is closed, handle 28 may be moved to a position in the general plane of housing 10 as indicated in broken lines 28[1], conveniently be used for carrying the viewer.

A focusing knob 30 projects out of housing 10. Turning this knob moves the projection lens axially to focus the image on screen 13. Details of the focusing mechanism are shown in FIG. 5.

The microfiche to be viewed is inserted through slot 32 into the nip between the feed rollers (as seen in FIG. 2). These feed rollers are rotated by means of knob 34 at the right side of the viewer to move the microfiche in a vertical direction. The rollers are mounted on a carriage (shown in detail in FIGS. 3–5) which is moved from side to side within the viewer by means of knob 36, movable from side to side in slot 37. By moving the microfiche by means of knobs 34 and 36, any image on the microfiche may be projected onto screen 13. Feed slot 32 extends sufficiently to each side to permit the images along the microfiche edges to be projected. Thin fingers 33 extend upwardly at the ends of the roller carriage to define a space therebetween into which the microfiche is inserted. Standard commercial microfiche may be viewed, or microfilm mounted in card apertures, etc. If desired, the microfiche may be enclosed in a transparent plastic sleeve, to prevent damage during handling.

An electrical switch 39 is provided to turn the projection lamp on and off. If an outside current source is to be used, a connecting cord may be connected to electrical connection 40.

Details of the viewer feed mechanism and optical system will be further understood upon reference to FIG. 2, which shows a vertical side section through the viewer. Some supporting structure is not shown in order that the novel features may be seen most clearly.

A microfiche sheet 45 is inserted through slot 32 into the nip between feed rollers 47 and 48, one of which is driven by means of knob 34 (shown in FIG. 1). The driven roller 47 is rotated to move microfiche downwardly into the viewer, until the desired horizontal row of images is located at the projection aperture in guide members 50 and 51, as indicated by broken lines at 52. The other feed roller is rotated by means of engaging gears on the shafts of rollers 47 and 48, as shown in FIG. 3. The feed roller carriage 54 is then moved by transversely sliding knob 36 in slot 37 to locate the desired frame in the previously selected row at the projection aperture. Carriage 54 and feed rollers 47 and 48 are shown in greater detail in FIGS. 3–5.

When switch 39 is turned "on," a projection lamp within lamp housing 55 is activated. Light passes through the apertures 52 in guide members 50 and 51, through the selected microfiche frame, through projection lens 57 mounted in housing 58, to upstanding mirror 15, to lower mirror 16 and finally to screen 13, where the microfiche image is presented for viewing. A typical light ray is shown at 60 to indicate this light path. The image on screen 13 is focused by moving lens 57 axially within housing 58 by the focusing mechanism shown in FIG. 6.

Microfiche 45 may be easily and conveniently moved to permit rapid viewing of a number of image frames. When the microfiche is further inserted into the viewer, the leading edge is guided within the slot formed between guide members 50 and 51. Desirably, either no images are included near the trailing edge of microfiche 45, or the microfiche is enclosed in a protective transparent sleeve extending beyond the trailing edge of the microfiche, so that the rollers 47 and 48 will remain in contact with the microfiche or sleeve even when the image row nearest the trailing edge is located at the projection aperture 52.

Lens 57 is mounted for axial sliding movement within housing 58 which is in turn suspended from a transverse bar 62 passing across housing 11. The mechanism for axially moving lens 57 during focusing is shown in FIG. 6.

After a viewing session is finished, microfiche 45 is removed, switch 39 is turned "off," and upstanding mirror 15 is moved forwardly away from stop 63. A pin (seen in FIG. 1) at the upper side edge of mirror 15 rides in slot 19, so that screen carrier 11 pivots about hinge 64 to a lowered, closed, position. Spring loaded pin 23, mounted in housing 66, has an enlarged head portion. As screen carrier 11 approaches the closed position, slot 25 engages pin 23. The edges of slot 25 are beveled slightly, to move the enlarged head of pin 23 slightly to the side. When the carrier 11 is fully closed, pin 23 reaches the enlarged terminal opening 67 of slot 25, so that the enlarged head of pin 23 drops into engagement with opening 67, locking carrier 11 in the closed position. This latch may be released by pressing on the outer end of pin 23 to move the enlarged head of pin 23 out of engagement with opening 67 (as seen in FIG. 1).

FIGS. 3 and 4 show detailed plan and end section views of the feed roller carriage 54. Carriage 54 includes a generally U-shaped frame member 70 having an upstanding arm 71. Knob 36 is formed on or secured to the end of arm 71. Feed rollers 47 and 48 are slidably mounted on a pair of shafts 73 and 74, respectively. The ends of shafts 73 and 74 are journaled in conventional bearings (not shown) at the sides of housing 11. One end of shaft 73 extends through the bearing and the wall of housing 11, terminating in feed knob 34. Rollers 47 and 48 have elastomeric surface layers. Preferably, rollers 47 and 48 are in contact or are very closely spaced so that the surface layers are compressed slightly when a microfiche is inserted therebetween. Meshing gears 76 and 77 are mounted on the ends of rollers 47 and 48, so that roller 48 rotates when roller 47 is rotated by turning knob 34.

As seen in section in FIG. 5, the internal bore of roller 47 has a flat portion 79 corresponding to a flat 80 on shaft 73, so that shaft 73 is locked to roller 47 in rotation, while permitting relative sliding movement between shaft 73 and roller 47.

Detail of a preferred projection lens focusing mechanism is shown in FIG. 6. Projection lens 57 is mounted for axial sliding movement within housing 58. Typically, lens 57 may slide within a cylindrical bore in housing 58, or the housing may have a generally V-shaped upper surface and a spring or clip may be provided to hold lens mount 57 in sliding contact with the housing surface. A shaft 81 extends through the wall of housing 11 from focusing knob 30 to an opening in the side of housing 58. An eccentric pin 82 secured near the edge of the end of shaft 81 projects into a circumferential groove 83 in lens mount 57. As knob 30 is turned, shaft 81 rotates, moving pin 82 in a circular path, resulting in axial movement of lens mount 57. This is an extremely simple, reliable and economical focusing mechanism.

FIG. 7 shows a vertical section through a viewer having an alternative microfiche feeding system. A generally rectangular viewer housing 110 has a screen carrier 111 pivotably mounted for movement between a closed and a viewing position. A viewing screen 113 is mounted in an opening in carrier 111. An upstanding mirror 115 mounted on backing support 114 and a lower mirror 116 are provided to reflect an image projected by a lens in lens mount 57 to screen 113. Pins (not shown) extending horizontally from the upper ends of backing support 114 slidingly engage slots 119 in carrier 113 for movement therealong during viewer opening and closing. Spring 121 biases support 114 into the open (viewing) position. A handle 128 is provided which is useful in carrying the closed viewer and as a support when viewing (in the manner shown in FIG. 1).

An electrical switch 139 is provided for turning a projection lamp within housing 155 off and on.

In use, a microfiche 145 or other sheet containing microimages, is inserted in slot 132. The microfiche is manipulated manually to locate the desired image frame at the projection aperture, indicated by broken lines at 152. Light from the projection lamp passes through the film, through lens 157, to upstanding mirror 115, then to lower mirror 116 and finally the image is presented on screen 113.

Any suitable focusing mechanism may be used to focus lens 157. The mechanism shown in FIG. 6 is especially simple and effective and is, therefore, preferred. Lens 157 is positioned for axially sliding movement within housing 158 which is in turn supported by legs 159.

The viewer embodiment shown in FIG. 7 is especially economical and simple to operate. However, the embodiment shown in FIGS. 1 and 2 is generally preferred because of the greater ease with which microfiche images may be selected and the more uniform alignment possible. Also, with the embodiment of FIG. 2, focus of images on the viewing screen is less likely to change when successive images on a microfiche are selected for viewing.

Although specific components and proportions have been shown and described in the above description of preferred embodiments, other suitable arrangements may be used with similar results, as indicated above.

Other modifications and applications of the present invention will occur to those skilled in the art upon reading the present disclosure. These are intended to be included within the scope of this invention, as defined in the appended claims.

What is claimed is:

1. A microfiche viewer comprising
   (a) a pair of substantially parallel, substantially contiguous rollers;
   (b) guide means for guiding a microfiche into the nip between said pair of rollers;
   (c) means for rotating said rollers to selectively move said microfiche through said nip in a first direction;
   (d) two guide members spaced apart a uniform distance slightly greater than the thickness of a microfiche to define a slot, said slot positioned to receive a microfiche exiting said roller nip as said rollers are rotated to move said microfiche in said first direction;
   (e) carriage means permitting axial movement of said rollers to move said microfiche in a second direction substantially perpendicular to said first direction;
   (f) a projection station adjacent said rollers through which said microfiche is moved in said first and second directions to locate a selected portion of said microfiche in said projection station, said projection station including a pair of aligned apertures through said guide members; and
   (g) optical projection system including a light source, a lens, a plurality of reflecting members and a screen arranged to project an image of the portion of said microfiche in said projection station onto said screen.

2. The microfiche viewer according to claim 1 wherein said optical projection system is movable between a viewing position in which said screen projects upwardly at a convenient viewing angle and a storage position in which said optical system is collapsed into a compact housing.

3. The microfiche viewer according to claim 1 wherein said guide means includes an elongated slot in the housing of said viewer, said slot located adjacent to and substantially parallel with the nip between said rollers and having a length approximately twice the width of said microfiche; and a pair of lateral guide fingers extending upwardly through said slot from said carriage to define the space into which said microfiche is inserted into proper engagement with said rollers.

4. The microfiche viewer according to claim 1, further including a handle member movable between a position for carrying said viewer and a position for partially supporting said viewer during viewing.

5. The microfiche viewer according to claim 1, further including a focusing system for said lens comprising
   (a) a generally cylindrical lens mount containing said lens;
   (b) a circumferential groove in the outer surface of said lens mount;
   (c) a support for said lens mount permitting axial movement thereof;
   (d) a rotatable shaft having an eccentric pin extending from the end thereof into said groove;
   (e) knob means on said shaft rotatable from the viewer exterior, whereby said eccentric pin moves said lens mount in an axial direction upon rotation of said knob.

6. A microfiche viewer comprising
   (a) a housing having a transverse slot near one end into which a microfiche sheet may be inserted;
   (b) spaced guide members extending inwardly from said slot to guide a microfiche inserted into said slot; said guide members including a projection aperture therethrough;
   (c) a projection lamp adjacent one side of said projection aperture to direct light through a microfiche frame therein;
   (d) a projection lens adjacent the side of said projection aperture opposite said lamp to receive and transmit light from said lamp;
   (e) a collapsible upstanding mirror positioned to receive light from said lens;
   (f) a fixed lower mirror positioned to receive light reflected from said lamp by said upstanding mirror;

(g) a pivotably movable viewing screen positioned to receive light from said lamp reflected by said lower mirror;

(h) said lens adapted to focus an image on said screen of the microfiche frame positioned at said projection aperture; and (i) said pivotable screen and collapsible mirror interconnected so that they are movable together between an extended viewing position and a collapsed storage position.

7. The microfiche viewer according to claim 6 wherein said transverse slot has a length nearly twice the width of said microfiche, and said guide members includes a pair of closely spaced walls which guide the leading edge of said microfiche past said projection aperture and into said viewer out of interference with other viewer components.

8. The microfiche viewer according to claim 6, further including a focusing system for said lens comprising
   (a) a generally cylindrical lens mount containing said lens;
   (b) a circumferential groove in the outer surface of said lens mount;
   (c) a support for said lens mount permitting axial movement thereof;
   (d) a rotatable shaft having an eccentric pin extending from the end thereof into said groove;
   (e) knob means on said shaft rotatable from the viewer exterior, whereby said eccentric pin moves said lens mount in an axial direction upon rotation of said knob.

9. The microfiche viewer according to claim 6, further including a handle member movable between a position for carrying said viewer and a position for partially supporting said viewer during viewing.

References Cited

UNITED STATES PATENTS

| | | | |
|---|---|---|---|
| 3,479,116 | 11/1969 | Anderson | 353—77 |
| 3,442,581 | 5/1969 | Smitzer et al. | 353—27 |
| 3,352,201 | 11/1967 | Brownscombe | 353—27 |
| 2,539,676 | 1/1951 | Sontag et al. | 353—74 X |
| 3,188,910 | 6/1965 | Brownscombe et al. | 353—25 X |
| 3,180,207 | 4/1965 | Herrmann | 353—78 X |
| 3,159,077 | 12/1964 | Hoag et al. | 353—25 |
| 3,446,552 | 5/1969 | Gross et al. | 353—27 |

FOREIGN PATENTS

| | | | |
|---|---|---|---|
| 996,137 | 8/1951 | France | 353—79 |
| 93,272 | 1/1969 | France | 353—78 |
| 1,542,455 | 9/1960 | France | 353—78 |

HARRY N. HAROIAN, Primary Examiner

U.S. Cl. X.R.

353—77